United States Patent [19]
Tsuda

[11] Patent Number: 5,384,591
[45] Date of Patent: Jan. 24, 1995

[54] ELECTROPHOTOGRAPHIC RECORDING DEVICE

[75] Inventor: Yukio Tsuda, Tokyo, Japan

[73] Assignee: Kabushiki Kaisha Toshiba, Kawasaki, Japan

[21] Appl. No.: 907,568

[22] Filed: Jul. 2, 1992

[30] Foreign Application Priority Data

Jul. 3, 1991 [JP] Japan ................. 3-163089

[51] Int. Cl.$^6$ ............... G01D 15/06; G01D 15/14
[52] U.S. Cl. ................... 346/154; 346/160
[58] Field of Search .................. 346/154, 160

[56] References Cited

U.S. PATENT DOCUMENTS

| | | | |
|---|---|---|---|
| 4,746,941 | 5/1988 | Pham et al. | 346/154 X |
| 4,748,465 | 5/1988 | Tsilibes et al. | 346/160 |
| 4,831,395 | 5/1989 | Pham et al. | 346/160 |
| 5,189,441 | 2/1993 | Fukui et al. | 346/160 |
| 5,200,763 | 4/1993 | Tanuma et al. | 346/154 X |

OTHER PUBLICATIONS

Kazuhiro Samejima & Masaru Ohnishi, *Compact LED Head*, Technological Research Report of the Electronic Communcations Society, 1985, at 1-5.

*Primary Examiner*—George H. Miller, Jr.
*Attorney, Agent, or Firm*—Finnegan, Henderson, Farabow, Garrett & Dunner

[57] ABSTRACT

An electrophotographic recording device comprises a photoconductive drum which is rotated at a constant speed, a charger for charging a photoconductive surface of the photoconductive drum, a recording head which includes a large number of light emitting diodes arranged in a line, and which exposes the charged photoconductive surface, in order to form an electrostatic image corresponding to image data on the photoconductive surface, a developing unit for developing the electrostatic image into a toner image, a transfer unit for transferring the toner image onto a paper sheet, a fixing unit for fixing the toner image transferred onto the paper sheet, a line density decision circuit for deciding the line density of an image from the image data, and an emission time setting circuit for determining an emission time of the light emitting diodes in accordance with the line density detected by the decision circuit, the emission time setting circuit determining a first emission time in relation to image data to be printed with a first line density, and determining a second emission time shorter than the first emission time in relation to image data to be printed with a second line density higher than the first line density.

11 Claims, 6 Drawing Sheets

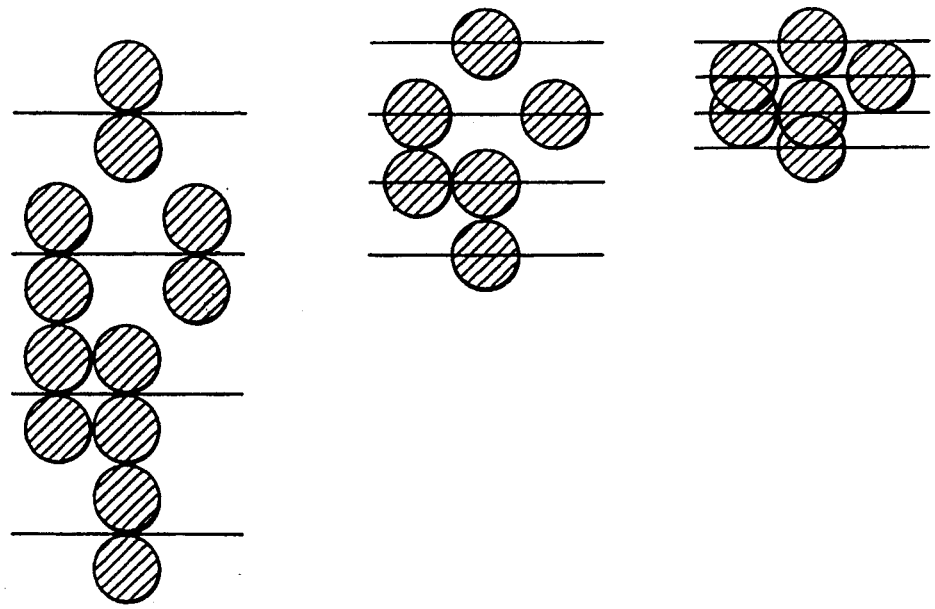
F I G. 1A
(PRIOR ART)
F I G. 1B
(PRIOR ART)
F I G. 1C
(PRIOR ART)
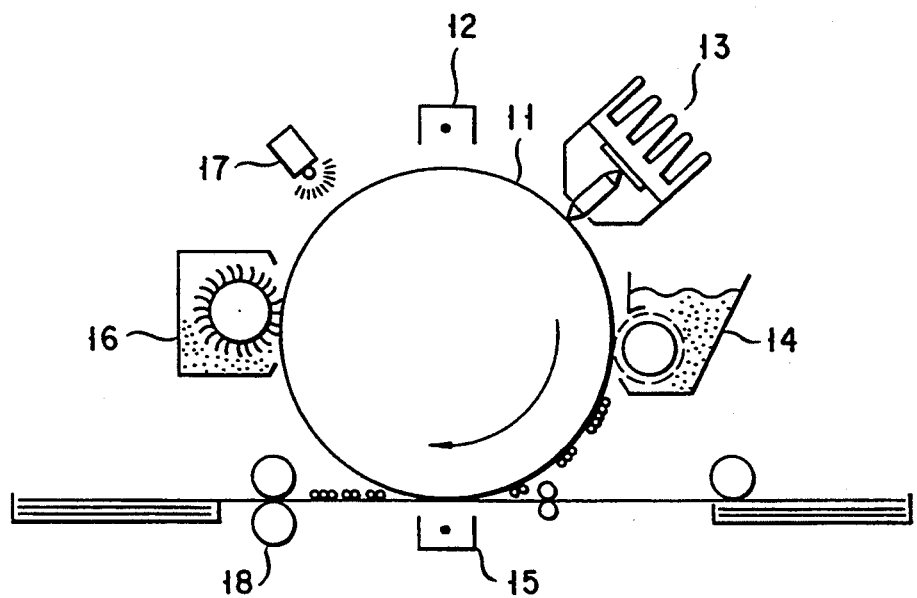
F I G. 2

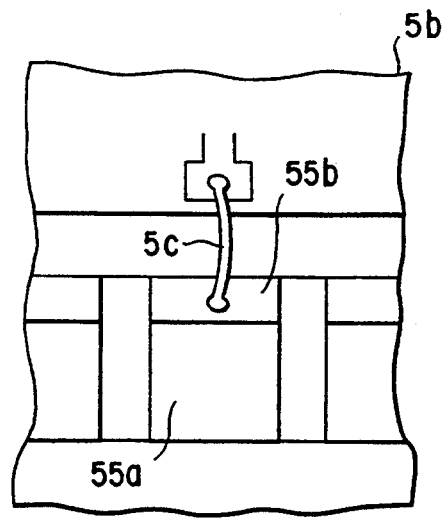
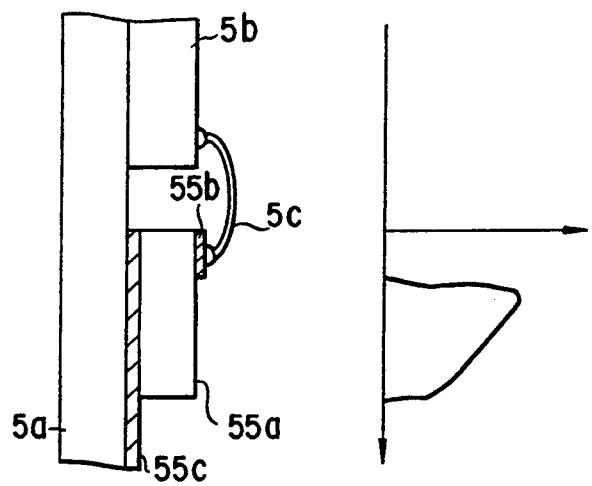
FIG. 7     FIG. 8     FIG. 9
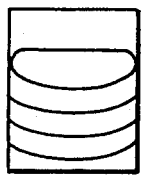
FIG. 10
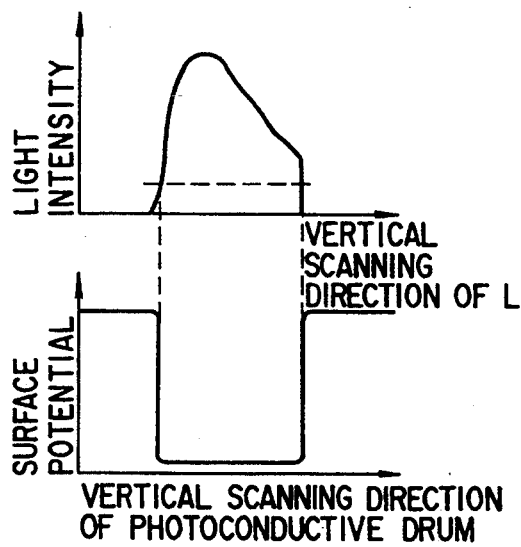
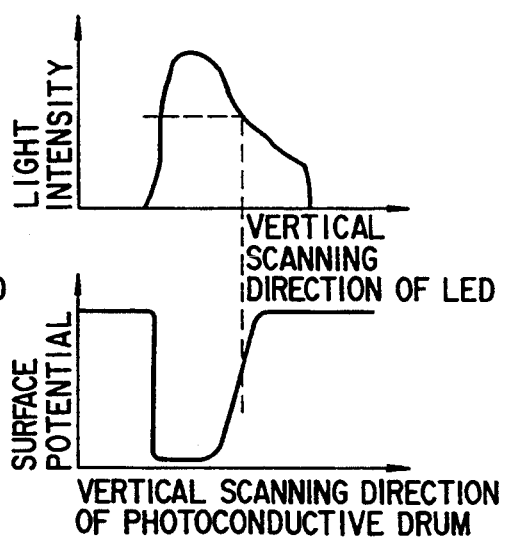
FIG. 11     FIG. 12

ELECTROPHOTOGRAPHIC RECORDING DEVICE

BACKGROUND OF THE INVENTION

1. Field of the Invention

The present invention relates to a printing device such as an LED printer for printing images on paper sheets, using a recording head which includes a large number of light emitting diodes (LEDs) arranged in a line.

2. Description of the Related Art

Generally, an LED printer has a recording head including a large number of LEDs arranged in a line and is used to print an image corresponding to an image signal on a paper sheet. This kind of printer is utilized as a small printer incorporated in a facsimile apparatus, for example. In such an LED printer, the LEDs are selectively activated so as to emit light in accordance with an image signal, whereby the electrostatic image corresponding to the image signal is formed on a charged photoconductive drum. The electrostatic image thus formed is developed using a toner, and the toner image is transferred onto a paper sheet and fixed, thus printing the image corresponding to the image signal on the paper sheet.

In CCITT (International Telegraph and Telephone Consultative Committee), the recording density in the horizontal scanning direction (the direction in which the LEDs are arranged) of a facsimile apparatus (G3 type) is determined as 8 dots/mm, and the recording density in the vertical scanning direction (i.e. the direction in which the photoconductive drum is rotated) is standardized as three values, 3.85 lines/mm, 7.7 lines/mm, and 15.4 lines/mm.

Considering the case where dots having a size according to a recording density of 8 dots/mm in the horizontal scanning direction are printed, when the recording density in the vertical scanning direction is 7.7 lines/mm, printing can be successfully performed as shown in FIG. 1B. When the recording density in the vertical scanning direction is 3.85 lines/mm, printing can also be successfully performed as shown in FIG. 1A, by printing the data corresponding to one line of dots twice.

However, when the recording density in the vertical scanning direction is 15.4 lines/mm, the dots overlap each other, as shown in FIG. 1C, thus degrading the quality of the image, since the recording density in the vertical scanning direction is higher than that in the main-scanning direction. If the size of the dots is decreased in accordance with a recording density of 15.4 lines/mm, the spaces between the dots arranged in the horizontal scanning direction are increased, again resulting in degraded image quality.

Thus, a conventional electrographic printing device has the drawback that when the recording density in the vertical scanning direction is higher than that of the horizontal scanning direction (e.g. 8 dots/mm×15.4 lines/mm), the dots overlap each other, decreasing the resolution and image quality.

SUMMARY OF THE INVENTION

It is therefore the object of the present invention to provide an electrophotographic recording device which can print images on paper sheets with a satisfactorily high resolution even when the recording density in the vertical scanning direction is higher than that in the horizontal scanning direction, and which realizes printing of high-quality images with various recording densities.

According to the present invention, there is provided an electrophotographic recording device comprising a photoconductive member which has a photoconductive surface and is rotated at a constant speed; a charger for charging the photoconductive surface of the photoconductive member; a recording head facing the photoconductive surface of the photoconductive member and including a large number of light emitting elements arranged in a line, for selectively emitting light in accordance with image data, the recording head exposing the charged photoconductive surface, in order to form an electrostatic image corresponding to the image data on the photoconductive surface as the photoconductive member moves relative to the recording head; a developing unit for developing the electrostatic image formed on the photoconductive surface into a developer image; a transfer unit for transferring the developer image onto a paper sheet; a fixing unit for fixing the developer image transferred onto the paper sheet; a line density decision circuit for deciding the line density of an image from the image data; and an emission time setting circuit for determining an emission time of the light emitting elements of the recording head in accordance with the line density detected by the line density decision circuit, the emission time setting circuit determining a first emission time in accordance with a first line density, and determining a second emission time shorter than the first emission time in accordance with a second line density higher than the first line density.

In such an electrophotographic recording device, the emission time over which the light emitting elements emit light is changed on the basis of the line density of the externally supplied image data to be printed. Therefore, in the case where the recording head and the photoconductive drum are moved relative to each other at a constant speed, the size of the dots printed in accordance with the line density of the image data is varied in the direction in which the photoconductive drum is moved. Specifically, when the line density is large, the dot size in the vertical scanning direction is decreased such that the dots do not overlap each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A to 1C each show three types of dot pattern in the case of printing by a conventional electrophotographic recording device;

FIG. 2 schematically shows the structure of the electrophotographic recording device according to one embodiment of the present invention;

FIG. 7 is a sectional plan view of the LED head used in the electronic printing device of the present invention;

FIG. 8 is a cross-sectional view of the LED head, taken along line 8—8 shown in FIG. 7;

FIG. 9 is a diagram showing the intensity distribution of the light emitted by an LED of the LED head shown in FIGS. 7 and 8;

FIG. 10 is a diagram showing the emission intensity distribution which can be observed when viewing the LED from the above;

FIG. 11 is a diagram showing the emission intensity distribution and the surface potential of the photoconductive drum in the case of an ordinary exposure time; and FIG. 12 is a diagram showing the emission intensity distribution and the surface potential of the photoconductive drum in the case of an exposure time shorter than the ordinary exposure time.

DETAILED DESCRIPTION OF THE PREFERRED EMBODIMENTS

Figure 3:
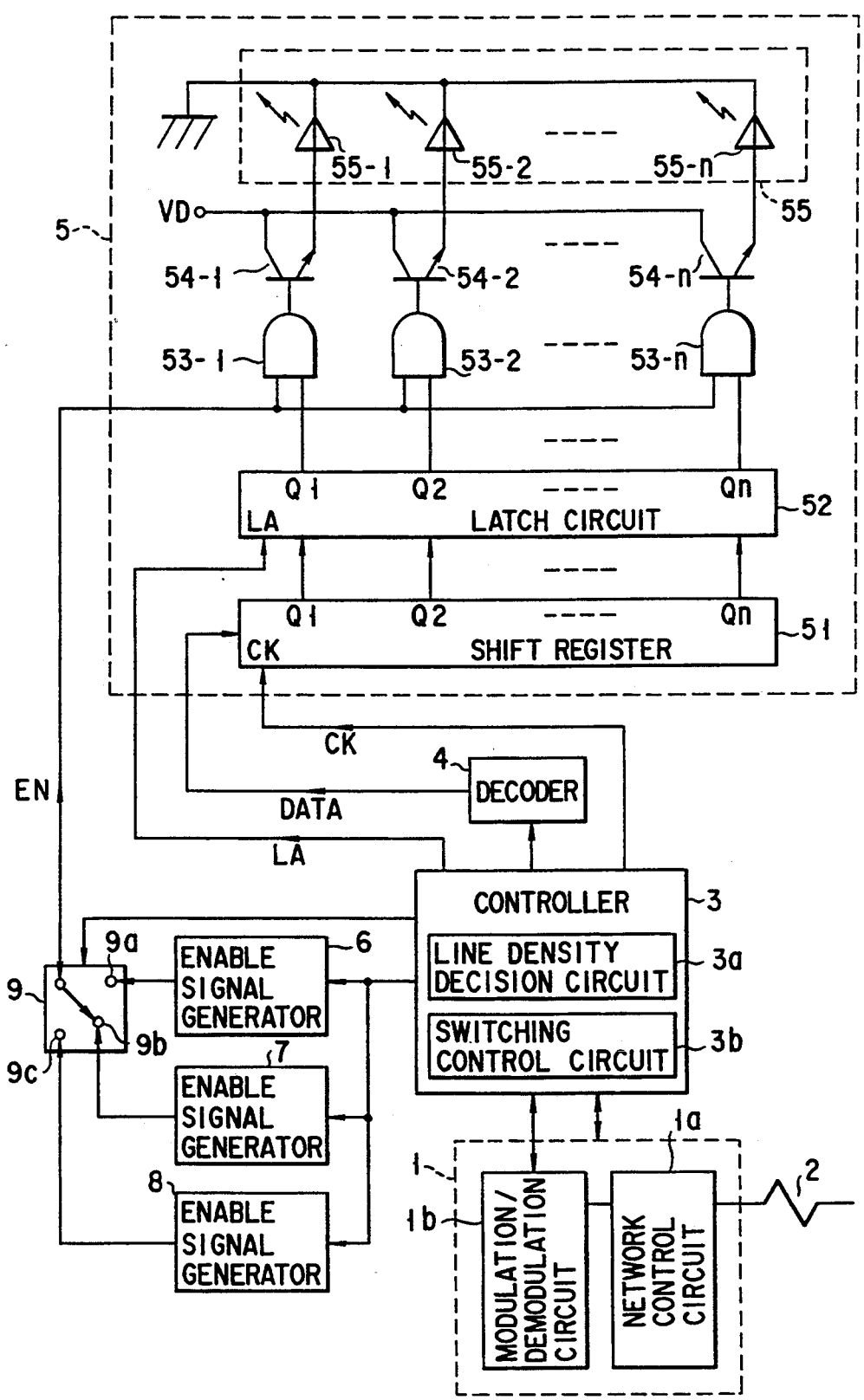
FIG. 3 is a block diagram illustrating a facsimile apparatus employing the electrophotographic recording device according to the above embodiment of the present invention.

According to the LED printer shown in FIG. 1, a charger 12, an LED head 13, a developing unit 14, a transfer/separation unit 15, a cleaner 16, and a discharger 17 are sequentially arranged along the circumferential surface of a photoconductive drum 11, and a fixing unit 18 is provided near the transfer/separation unit 15.

When the LED printer having the aforementioned structure is operated, the photoconductive drum 11 is charged by the charger 12. The charged photoconductive surface of the photoconductive drum is exposed by the LED head 13, in accordance with the image to be printed, as a result of which an electrostatic image is formed on the photoconductive surface. Toner supplied from the developing unit 14 adheres to the electrostatic image, thus forming a toner image on the photoconductive surface; in other words, developing the electrostatic image.

Next, a recording medium, i.e. paper sheet 19 is superposed on the photoconductive surface of the photoconductive drum 11, and the transfer/separation unit 15 applies an electric charge having the same polarity as the electrostatic image to the paper sheet 19, whereby the toner image formed on the photoconductive surface is transferred onto the paper sheet 19. The paper sheet onto which the toner image has been transferred is separated from the photoconductive drum 11. Then, the toner image is melted and adheres to the paper sheet at the fixing unit 18, after which this paper sheet is discharged from the printing device.

After separation of the paper sheet from the photoconductive drum 11, the toner left on the photoconductive surface instead of being transferred is eliminated by the cleaner 16, and the residual electric charge on the photoconductive surface is discharged by the discharger 17.

The LED head 13 used in the printing of an image as explained above includes a large number of LEDs which are arranged in a line on a substrate, and a large number of rod lens arranged in arrays for focusing the light beams emitted from the respective LEDs on the photoconductive drum 11. The light beams emitted from the LED head 13 and illuminating the photoconductive drum 11 are circular in cross section.

A facsimile apparatus incorporating the LED printer according to this embodiment will now be explained with reference to FIG. 3. In this drawing, only a signal receiving section is shown, and a signal transmitting section is excluded.

A transmitter-receiver unit 1 includes a network controller 1a and a demodulator 1b. When a call is made through a public telephone line 2, the network controller 1a accordingly performs a network control such as setting up a link. The demodulator 1b demodulates a facsimile transmission signal transmitted through the public telephone line 2, extracts image data therefrom, and supplies the extracted image data to a control unit 3.

The control unit 3 comprehensively controls the facsimile apparatus. To be specific, the control unit 3 stores in the buffer incorporated therein the image data supplied from the demodulator 1b. When image data of one page is stored in the buffer, the control unit 3 supplies the one-page image data to a decoder 4. This decoder decodes the image data which has been subjected to redundancy suppression coding (e.g. MF coding), reproduces the original image data, and supplies the reproduced image data to an LED unit 5 of the LED head 13.

The LED unit 5 includes a shift register 51, a latch circuit 52, AND gates 53-1, 53-2 ..., 53-n, switching-/amplifying transistors 54-1, 54-2 ..., 54-n, and an LED group 55.

The shift register 51 is an n-bit shift register, which shifts, holds, and outputs, as parallel data, the image data supplied from the demodulator 4. In synchronization with a latch signal LA output from the control unit 3, the latch circuit 52 fetches and holds n bits which are output from the shift register 51. Then, the latch circuit 52 outputs the n bits, one bit being supplied to one of two input terminals of each of the AND gates 53-1 to 53-n. The other input terminal of each of the AND gates 53-1 to 53-n receives, as an enable signal EN, one of the signals which are output from enable signal generators 6, 7, and 8 through a change-over switch 9. Only when the enable signal EN is at "H" level, are the outputs of the latch circuit 52 supplied to the switching-/amplifying transistors 54-1 to 54-n.

The switching/amplifying transistors 54-1 to 54-n are connected respectively to the anodes of LEDs 55-1, 55-2 ..., 55-n, which form the LED group 55 and which are n in number. Only when inputs are at "H" levels, the switching/amplifying transistors 54-1 to 54-n apply a drive voltage VD to the anodes of the LEDs 55-1, 55-2 ..., 55-n. The cathodes of the LEDs 55-1 to 55-n are grounded.

In a predetermined cycle T1, the enable signal generator 6 outputs pulses, each of which is "H" level over a predetermined period TA. In a cycle T2, two times longer than the predetermined cycle T1, the enable signal generator 7 outputs pulses, each of which is "H" level over a predetermined period TB. In a cycle T3, four times longer than the predetermined cycle T1, the enable signal generator 8 outputs pulses, each of which is "H" level over a predetermined period TC. The periods TA, TB, and TC have a relation of TA<TB<TC. In this embodiment, TB is two times longer than TA, and TC is four times longer than TA. Each of the enable signal generators 6 and 8 outputs pulses in synchronization with a predetermined timing signal TM supplied from the control unit 3. The pulse width TB of each of the pulses generated by the enable signal generator 7 accords with a recording density of 8 dots/mm in the horizontal scanning direction, and is equal to the time required for forming dots such as those shown in FIGS. 1A to 1C.

One of the output signals from the enable signal generators 6 to 8 is selected by the change-over switch 9, and is output to the AND gates 53-1 to 53-n as the enable signal EN. The switching operation of the change-over switch 9 is controlled by the control unit 3.

The control unit 3 includes a main control circuit such as a microcomputer, a line density decision circuit 3a, and a switching control circuit 3b, in addition to a known processing means generally used in a facsimile apparatus. From the mode determined prior to receipt of image data, the line density decision circuit 3a detects the line density of the image which will be received. The switching control circuit 3b switches the change-over switch 9 in accordance with the line density detected by the line density decision circuit 3a. The switching control circuit 3a, the enable signal generators 6 to 8, and the change-over switch 9 form a drive period setting circuit which performs setting of the drive period over which the LEDs 55-1 to 55-n are driven.

Figure 4:
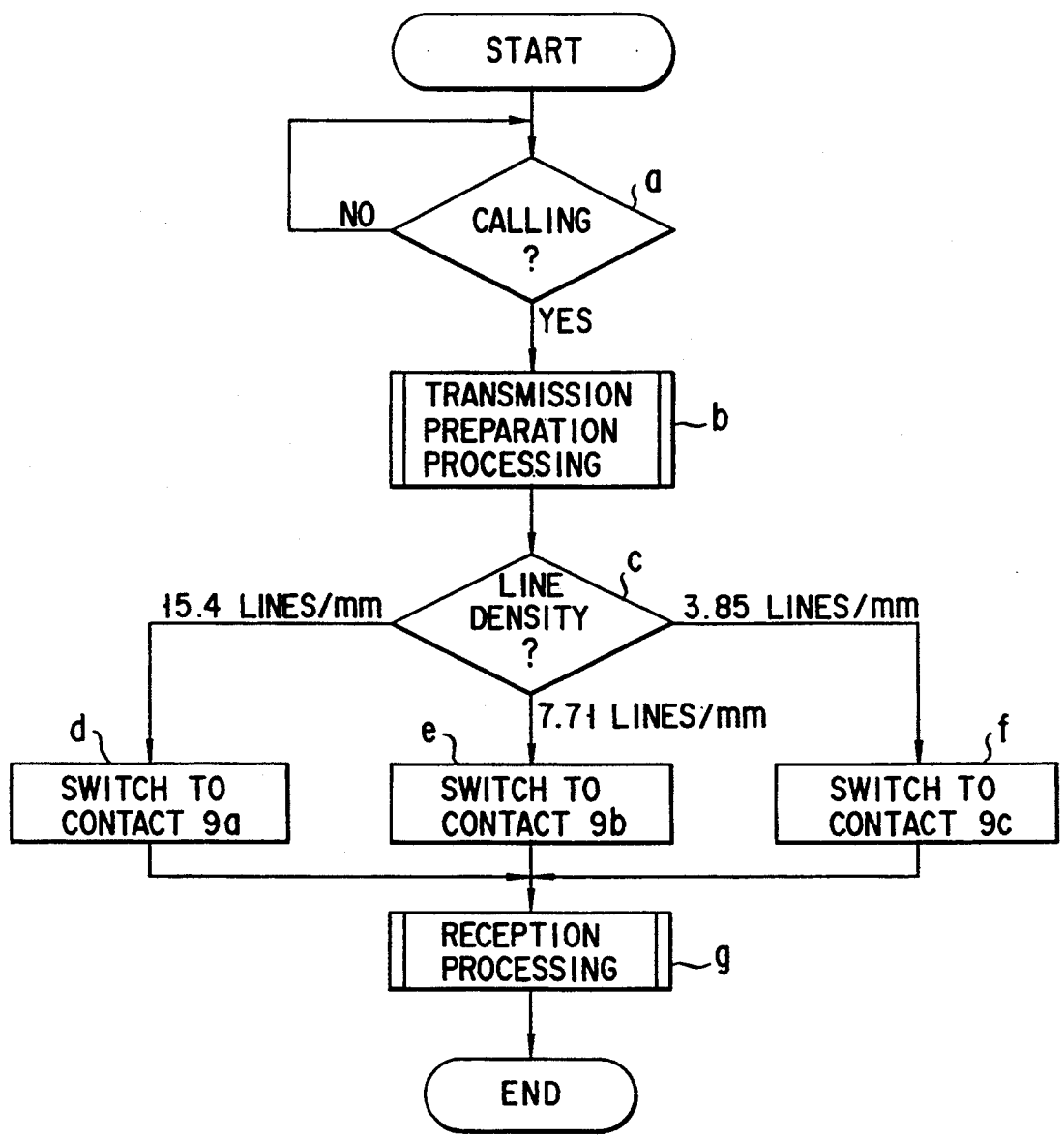
FIG. 4 is a flowchart explaining the steps carried out by the control unit shown in FIG. 3.

The operation of the facsimile apparatus having the aforementioned structure will now be described in correspondence with the steps shown in FIG. 4 and carried out by the control unit 3.

In step "a", the control unit 3 checks whether a call has been made. When a call has been made, the processing by the control unit 3 shifts from step "a" to step "b". In step "b", the control unit 3 performs generally known transmission preparation processing, which includes a mode setting step and a training step. After the transmission preparation processing, the control unit 3 determines in step "c" which of 3.85 lines/mm, 7.7 lines/mm, and 15.4 lines/mm is the line density of the image to be transmitted later, on the basis of the mode determined during the transmission preparation processing of step "b". The processing in step "c" is performed by the line density decision circuit 3a.

When the line density is 15.4 lines/mm, the processing by the control unit 3 shifts from step "c" to step "d". In step "d", the control unit 3 switches the change-over switch 9 so as to select a terminal 9a, with the result that the output signal from the enable signal generator 6 is selected as the enable signal EN.

When the line density is 7.7 lines/mm, the processing by the control unit 3 shifts from step "c" to step "e". In step "e", the control unit 3 switches the changed-over switch 9 so as to select a terminal 9b, with the result the output signal from the enable signal generator 7 is selected as the enable signal EN.

When the line density is 3.85 lines/mm, the processing by the control unit 3 shifts from step "c" to step "f". In step "f", the control unit 3 switches the change-over switch 9 so as to select a terminal 9c, with the result that the output signal from the enable signal generator 8 is selected as the enable signal EN. The processes in steps "d", "e", and "f" are carried out by the switching control circuit 3B.

The processing by the control unit 3 shifts to step "g" after the control unit 3 performs switching of the change-over switch 9 in accordance with the line density of the image to be transmitted. In step "g", the control unit 3 performs reception processing by a known procedure. Upon completion of this processing, the control unit 3 finishes all the procedures required for one-time communication. The aforementioned reception processing is generally known and includes a step of outputting the image data supplied from a modulation/demodulation circuit 1b to the decoder 4 at a predetermined timing, and a step of generating and outputting a clock signal CK, the latch signal LA, and the timing signal TM in synchronization with the image data.

While the control unit 3 is performing the aforementioned processes, the image data which is output therefrom during the reception processing (step "g") is decoded by the decoder 4, and is thereafter input to the LED head 5.

Figure 5:
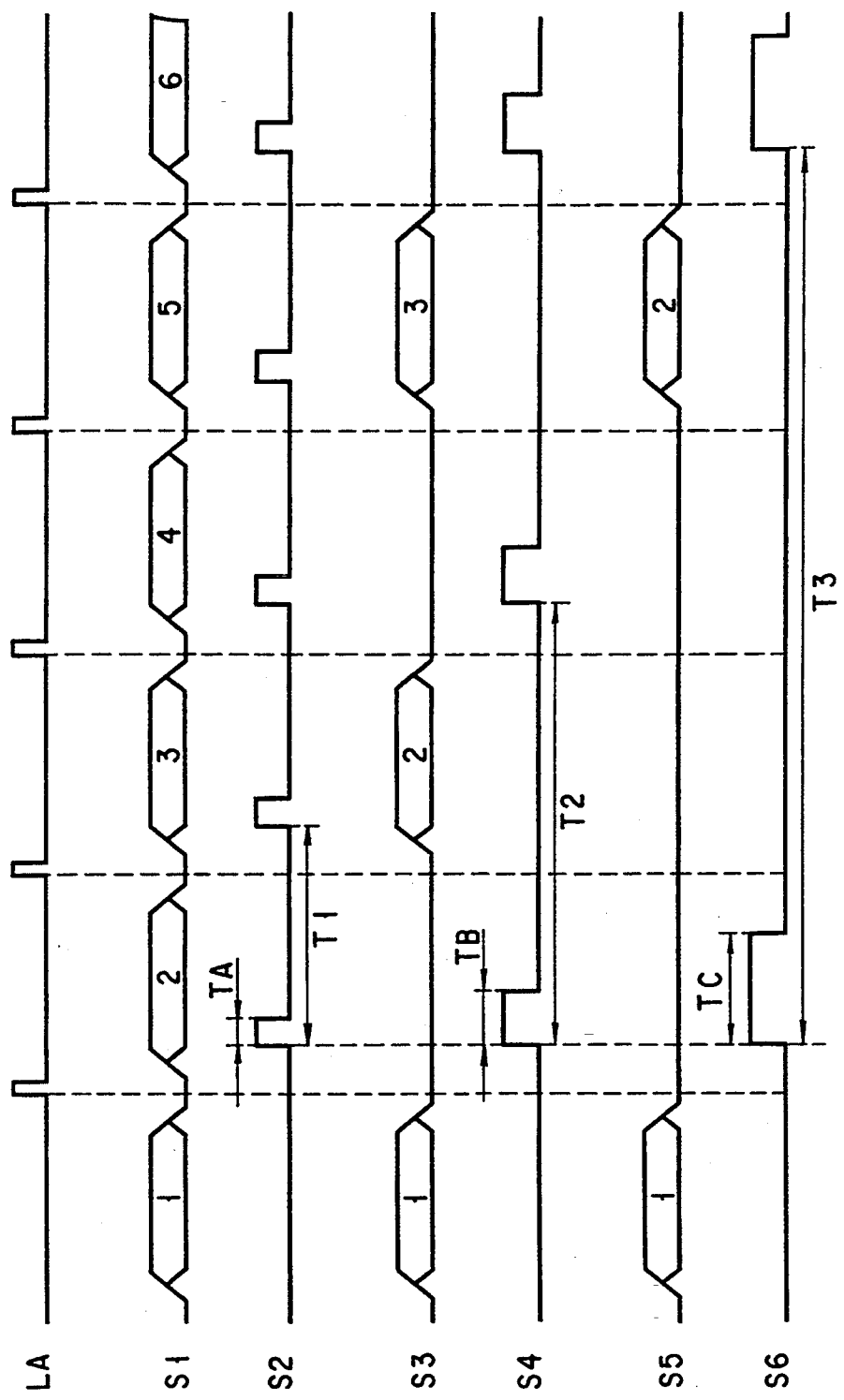
FIG. 5 is a timing chart showing the operation timing of each of parts of the apparatus shown in FIG. 3.

In the LED head 5, the LEDs 55-1 to 55-n are driven in accordance with the image data supplied from the decoder 4 through the shift register 51, the latch circuit 52, the AND gates 53-1 to 53-n, and the switching/amplifying transistors 54-1 to 54-n. The LEDs 55-1 to 55-n are driven as follows:

When the line density is 15.4 lines/mm, the shift register 51 sequentially fetches, as shown by S1 in FIG. 5, the data to be printed in the form of dots arranged in lines. The data corresponding to one line of dots and fetched into the shift register is fetched into the latch circuit 52 in synchronization with an "H" level pulse of the latch signal LA. The LEDs 55-1 to 55-n forming the LED group 55 are driven on the basis of the data fetched into and held by the latch circuit 52, and exposure is performed to form one line of dots. In this case, the terminal 9a (connected to the enable signal generator 6) is selected in the change-over switch 9, and as shown by S2 in FIG. 5, pulses having a width of TA and generated in the predetermined cycle T1 (which is the same as that of the "H" level pulses of the latch signal LA) are used as the enable signal. The period of time over which exposure is performed to form one line of dots is TA.

When the line density is 7.7 lines/mm, the shift register 51 sequentially fetches, as shown by S3 in FIG. 5, the data to be printed in the form of dots arranged in lines. Since this line density is half of 15.4 lines/mm (in other words, the number of lines of dots is half), the control unit 3 outputs the data at such a rate that it will be printed in the form of dots arranged in lines spaced apart at twice the intervals at which dots are printed at a density of 15.4 lines/mm. The data corresponding to one line of dots and fetched into the shift register 51 is fetched into the latch circuit 52 in synchronization with the latch signal LA, and is used to drive the LEDs 55-1 to 55-n. In this case, the terminal 9b (connected to the enable signal generator 7) is selected in the change-over switch 9, and as shown by S4 in FIG. 4, pulses having a width of TB (two times greater than TA) and generated in the predetermined cycle T2 (two times longer than T1) are used as the enable signal. The period of time over which exposure is performed to form one line of dots is TB, which is two times longer than in the case where the line density is 15.4 lines/mm.

When the line density is 3.85 lines/mm, the shift register 51 sequentially fetches, as shown by S5 in FIG. 5, the data to be printed in the form of dots. Since this line density is a quarter of 15.4 lines/mm (in other words, the number of lines of dots is one quarter), the control unit 3 outputs the data at such a rate that it will be printed in the form of dots arranged in lines spaced apart at quadruple the intervals at which dots are printed at a density of 15.4 lines/mm. The data corresponding to one line of dots and fetched into the shift register 51 is fetched into the latch circuit 52 in synchronization with the latch signal LA, in order to drive the LEDs 55-1 to 55-n. In this case, the terminal 9c is selected in the change-over switch 9, and pulses having a width of TC (four times greater than TA) and generated in the predetermined cycle T3 (four times longer than T1) are used as the enable signal. The period of time over which exposure is performed to form one line of dots is TC, which is four times longer than in the case where the line density is 15.4 lines/mm.

As can be understood from the above, when the line density is 15.4 lines/mm, exposure is performed such that four lines of dots are formed per unit time. When the line density is 7.7 lines/mm, exposure is performed such that two lines of dots are formed per unit time, and when the line density is 3.85 lines/mm, exposure is performed such that one line of dots is formed per unit time. The LED emission time (the exposure time) in the case of 7.7 lines/mm is twice, and the LED emission time in the case of 3.85 lines/mm is quadruple, compared to the case where the line density is 15.4 lines/mm.

Though the timing of exposure and the exposure period are different according to the line density, as described above, the rotation speed of the drum is constant. Therefore, the aforementioned differences in exposure times affect the lengths of dots in the vertical scanning direction. The reason for this is described below:

In the LED head including the LEDs arranged in arrays, each pixel of the LED unit 5 has the structure shown in FIGS. 7 and 8. To be specific, an LED common electrode 55c is formed on a substrate 5a, and an LED material 55a is mounted on the common electrode 55c. A long and narrow drive electrode 55b is formed on a portion of the LED material 55a which is proximate to a driver IC 5b. The drive electrode 55b is connected to a pad of the driver IC 5b via a connection lead 5c.

When a drive voltage is applied to the LED group 55 by the driver IC 5b, the LED material 55a emits light with the distribution that the light intensity is highest in the vicinity of the drive electrode as shown in FIG. 9, and that the longer the distance from the drive electrode, the lower the light intensity. In FIG. 9, the axis of ordinates shows the position of the LED head in the vertical scanning direction, and the axis of abscissa shows relative speed. The reason the intensity of the emitted light differs according to the distance from the drive electrode is that when a current is supplied to the LED material 55a from the drive electrode 55b, the current concentrates mostly in vicinity of the drive electrode 55b, with the result that the intensity of the emitted light is highest in the proximity of the drive electrode 55b. The emitted light intensity distribution, when viewed from above the drive electrode 55b and when representing it with a contour line, is as shown in FIG. 10, where an ellipse shape extending in the horizontal scanning direction represents that portion of the LED material 55a in which the light intensity is highest. When the photoconductive drum is exposed to light, using the LED which shows such an intensity distribution, the surface potential of the photoconductive drum differs according to the amount of exposure (i.e. the emitted light intensity × the emission time), as shown in FIGS. 11 and 12. FIG. 11 shows the surface potential when the photoconductive drum is exposed to light over an ordinary exposure time, and FIG. 12 shows the surface potential when the photoconductive drum is exposed over an exposure time shorter than, for example, half the ordinary exposure time. In a developing mode wherein toner normally adheres to a low surface-potential portion of the photoconductive surface of the photoconductive drum, the width of dots in the vertical scanning direction is small, as shown in FIG. 6C, when the exposure time is short. More specifically, when the line density is 7.7 lines/mm, the dots shown in FIG. 6B are obtained. The exposure time TB accords with a recording density of 8 dots/mm, and is equal to the time required for forming the dots shown in FIG. 1B. When the line density is 3.85 lines/mm, the dots shown in FIG. 6A, extending in the vertical scanning direction, are obtained. The exposure time TC is twice the exposure time TB, and a region of the photoconductive drum which is exposed to light is two times larger in the vertical scanning direction, compared to the case where the line density is 7.7 lines/mm. When the line density is 15.4 lines/mm, the dots shown in FIG. 6C, whose sizes in the sub-scanning direction are small, are obtained. The exposure time TA is half the exposure time TB, and a region of the photoconductive drum which is exposed to light is half in the vertical scanning direction, compared to the case where the line density is 7.7 lines/mm.

Figure 6A:
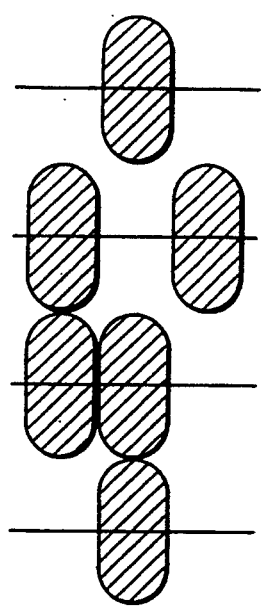
FIGS. 6A to 6C show three types of dot pattern printed by the electrophotographic recording device of the present invention.
Figure 6B:
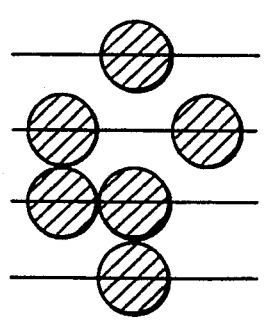
Figure 6C:
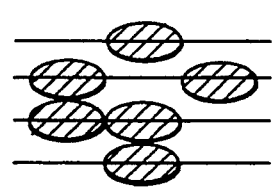

According to the present invention, whether the line density is 3.85 lines/mm, 7.7 lines/mm, or 15.4 lines/mm, printing can be successfully performed, as shown in FIGS. 6A, 6B, and 6C, without degradation of image quality due to overlapping of the dots.

The present invention is not limited to the aforementioned embodiment. For example, according to this embodiment, the electrophotographic recording device is applied to a facsimile apparatus, and the line density of the image to be recorded is determined in accordance with a mode. However, determination of the line density can be performed by another method such as counting the amount of image data of one page. Further, according to this embodiment, the line density decision circuit 3a and the switching control circuit 3b are employed, and the enable signal is automatically switched in accordance with the image to be printed. However, a method such as switching the enable signal in accordance with an externally supplied instruction, or manually switching the change-over switch 9, can be adopted.

Moreover, according to the above embodiment, the LED emission time when the line density is 7.7 lines/mm is twice, and the LED emission time when the line density is 3.85 lines/mm is quadruple, compared to the case where the line density is 15.4 lines/mm. However, such a relationship is different in accordance with various characteristics including the characteristics of the photoconductive drum, and is not limited to that in the case of this embodiment. That is, the LED emission time in 7.7 lines/mm or 3.85 lines/mm may be substantially twice or quadruple, compared to that in 15.4 lines/mm.

In the above embodiment, as described above, the invention is applied to a facsimile apparatus. However, the invention may be practiced in an electrophotographic recording device which is used either alone or in cooperation with another type of apparatus.

Further, in the aforementioned embodiment, three types of line densities, i.e. 3.85 lines/mm, 7.7 lines/mm, and 15.4 lines/mm, are presented, and three enable signal generators corresponding to these three types of line densities are employed. However, these line densities are arbitrary, and it is possible to employ two, four, or more enable signal generators corresponding to two, four, or more line densities.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electrophotographic recording device comprising:
    means for outputting image data corresponding to an image to be printed;
    a photoconductive member having a photoconductive surface and being moved at a constant speed;
    charger means for charging the photoconductive surface of said photoconductive member;
    a recording head facing the photoconductive surface of said photoconductive member and including a plurality of light emitting elements arranged in a line for selectively emitting light in accordance with the image data, said recording head exposing said photoconductive surface charged by said charger means to form an electrostatic image corresponding to the image data on said photoconductive surface as said photoconductive member moves relative to said recording head;
    developing means for developing the electrostatic image formed on said photoconductive surface into a developer image;
    transfer means for transferring the developer image onto a recording medium;
    fixing means for fixing the developer image transferred onto the recording medium;
    line density detecting means for detecting a line density of the image from the image data; and
    emission time setting means for determining an emission time for the light emitting elements of said recording head based on the line density detected by said line density detecting means, said emission time setting means determining a first emission time, when a first line density is detected, and determining a second emission time that is shorter than said first emission time, when a second line density is detected that is higher than said first line density.

2. The electrophotographic recording device according to claim 1, wherein, when said second line density is twice said first line density, the second emission time is determined by said emission time setting means to be half the first emission time.

3. The electrophotographic recording device according to claim 1, wherein said emission time setting means comprises pulse generating means for outputting to said recording head a pulse signal having a pulse width corresponding to the line density.

4. The electrophotographic recording device according to claim 1, wherein said light emitting elements comprise a plurality of light emitting diodes and the recording head further includes driving means for receiving image data and selectively driving said light emitting diodes in accordance with said image data and the emission time determined by said emission time setting means.

5. The electrophotographic recording device according to claim 4, wherein said driving means comprises a shift register for serially receiving image data from said image data outputting means and for outputting the serial image data as parallel image data, and means for driving said light emitting diodes in accordance with the parallel image data from said shift register and the emission time determined by said emission time setting means.

6. An electrophotographic recording device comprising:
    image data outputting means for outputting image data corresponding to an image to be printed;
    a photoconductive drum having a photoconductive surface and being rotated at a constant speed;
    charger means for charging the photoconductive surface
    a recording head facing the photoconductive surface of said photoconductive drum and including a plurality of light emitting diodes arranged in a line for selectively emitting light in accordance with the image data, said recording head exposing said photoconductive surface charged by said charger means to form an electrostatic image corresponding to the image data on said photoconductive surface;
    developing means for developing into a toner image the electrostatic image formed on said photoconductive surface;
    transfer means for transferring the toner image onto a recording medium;
    fixing means for fixing the toner image transferred onto the recording medium;
    detecting means for detecting a line density of the image from the image data; and
    emission time setting means for setting an emission time for said light emitting diodes based on the line density detected by said detecting means, said emission time setting means determining a first emission time for image data to be printed with a first line density and determining a second emission time that is shorter than said first emission time for image data to be printed with a second line density that is higher than said first line density.

7. The electrophotographic recording device according to claim 6, wherein, when said second line density is twice said first line density, the second emission time is determined by said emission time setting means to be half the first emission time.

8. The electrophotographic recording device according to claim 6, wherein said emission time setting means comprises pulse generating means for outputting to said recording head a pulse signal having a pulse width corresponding to the line density.

9. The electrophotographic recording device according to claim 6, wherein said recording head further includes driving means for receiving image data and selectively driving said light emitting diodes in accordance with said image data and the emission time determined by said emission time setting means.

10. The electrophotographic recording device according to claim 6, wherein said driving means comprises a shift register for serially receiving image data from said image data outputting means and for outputting the serial image data as parallel image data, and means for driving said light emitting diodes in accordance with the parallel data from said shift register and the emission time determined by said emission time setting means.

11. The electrophotographic recording device according to claim 6, wherein said image data outputting means is arranged in a facsimile apparatus, and is capable of demodulating a received signal and outputting the demodulated signal as image data.

* * * * *

UNITED STATES PATENT AND TRADEMARK OFFICE
CERTIFICATE OF CORRECTION

PATENT NO. : 5,384,591
DATED : January 24, 1995
INVENTOR(S) : Yukio Tsuda et al

It is certified that error appears in the above-indentified patent and that said Letters Patent is hereby corrected as shown below:

Claim 6, Column 10, Line 27, after "surface" insert
--of said photoconductive drum;--.

Signed and Sealed this

Thirteenth Day of June, 1995

Attest:

BRUCE LEHMAN

*Attesting Officer*  *Commissioner of Patents and Trademarks*